United States Patent
Jreij et al.

(10) Patent No.: US 11,809,912 B2
(45) Date of Patent: Nov. 7, 2023

(54) SYSTEM AND METHOD FOR ALLOCATING RESOURCES TO PERFORM WORKLOADS

(71) Applicant: Dell Products L.P., Hopkinton, MA (US)

(72) Inventors: Elie Antoun Jreij, Pflugerville, TX (US); William Price Dawkins, Lakeway, TX (US); Gaurav Chawla, Austin, TX (US); Mark Steven Sanders, Roanoke, VA (US); Walter A. O'Brien, III, Westborough, MA (US); Mukund P. Khatri, Austin, TX (US); Robert Wayne Hormuth, Cedar Park, TX (US); Yossef Saad, Gannei Tikva (IL); Jimmy Doyle Pike, Georgetown, TX (US)

(73) Assignee: DELL PRODUCTS L.P., Hopkinton, MA (US)

( * ) Notice: Subject to any disclaimer, the term of this patent is extended or adjusted under 35 U.S.C. 154(b) by 106 days.

(21) Appl. No.: 17/117,054

(22) Filed: Dec. 9, 2020

(65) Prior Publication Data
US 2022/0179700 A1    Jun. 9, 2022

(51) Int. Cl.
G06F 9/50    (2006.01)

(52) U.S. Cl.
CPC ............ *G06F 9/505* (2013.01); *G06F 9/5038* (2013.01)

(58) Field of Classification Search
CPC .............................. G06F 9/505; G06F 9/5038
See application file for complete search history.

(56) References Cited

U.S. PATENT DOCUMENTS

| | | |
|---|---|---|
| 7,478,117 B1 | 1/2009 | Lamb et al. |
| 7,606,892 B2 | 10/2009 | Piet et al. |
| 7,620,984 B2 | 11/2009 | Kallahalla |
| 8,095,929 B1 | 1/2012 | Ji et al. |
| 8,276,140 B1 | 9/2012 | Beda, III et al. |

(Continued)

OTHER PUBLICATIONS

Anonymous: "Dell Chassis Management Controller Version 6.20 for PowerEdge M1000e" Dec. 3, 2018 (Dec. 3, 2018), XP055822038, Retrieved from the Internet: URL:https://dl.del/com/topicspdf/dell-chassis-management-controller-v620-poweredge-m1000e_users-guide_en-US.pdf (274 pages).

(Continued)

*Primary Examiner* — Sisley N Kim
(74) *Attorney, Agent, or Firm* — Chamberlain, Hrdlicka, White, Williams & Aughtry

(57) ABSTRACT

A system control processor manager for servicing workloads using composed information handling systems instantiated using information handling systems includes persistent storage and a workload manager. The workload manager obtains a workload request for a workload of the workloads; predicts future resource needs for the workload during a future time period; makes a determination that a portion of free resources of the information handling systems are available to meet the future resource needs; reserves the portion of the free resources based on the determination to obtain reserved resources during the future time period; and composes a composed information handling system of the composed information handling systems using the reserved resources during the future time period to service the workload request.

17 Claims, 9 Drawing Sheets

(56) References Cited

U.S. PATENT DOCUMENTS

| | | |
|---|---|---|
| 3,285,747 A1 | 10/2012 | English |
| 8,306,948 B2 | 11/2012 | Chou |
| 8,499,066 B1 | 7/2013 | Zhang et al. |
| 8,589,659 B1 | 11/2013 | Shapiro |
| 8,606,920 B1 | 12/2013 | Gupta et al. |
| 8,751,546 B1 | 6/2014 | Grieve |
| 8,997,242 B2 | 3/2015 | Chen |
| 9,104,844 B2 | 8/2015 | Fang |
| 9,105,178 B2 | 8/2015 | Carlson |
| 9,245,096 B2 | 1/2016 | Abuelsaad |
| 9,413,819 B1 | 8/2016 | Berg et al. |
| 9,529,689 B2 | 12/2016 | Ferris et al. |
| 9,569,598 B2 | 2/2017 | Abuelsaad |
| 9,600,553 B1 | 3/2017 | Nigade et al. |
| 9,613,147 B2 | 4/2017 | Carlson |
| 9,678,977 B1 | 6/2017 | Aronovich |
| 9,959,140 B2 | 5/2018 | Jackson |
| 10,097,438 B2 | 10/2018 | Ferris et al. |
| 10,348,574 B2 | 7/2019 | Kulkarni |
| 10,382,279 B2 | 8/2019 | Roese |
| 10,601,903 B2 | 3/2020 | Bivens |
| 10,628,225 B2 | 4/2020 | Yamato |
| 10,756,990 B1 | 8/2020 | Chakkassery Vidyadharan et al. |
| 10,782,882 B1 | 9/2020 | Wu |
| 10,795,856 B1 | 10/2020 | Smith et al. |
| 10,848,408 B2 | 11/2020 | Uriel |
| 10,909,283 B1 | 2/2021 | Wang et al. |
| 10,994,198 B1 | 5/2021 | Byskal et al. |
| 11,119,739 B1 | 9/2021 | Allen et al. |
| 11,134,013 B1 | 9/2021 | Allen et al. |
| 11,221,886 B2 | 1/2022 | Bivens et al. |
| 11,537,421 B1 | 12/2022 | Brooker et al. |
| 2003/0028642 A1 | 2/2003 | Agarwal et al. |
| 2003/0061262 A1 | 3/2003 | Hahn et al. |
| 2003/0233427 A1 | 12/2003 | Taguchi |
| 2004/0257998 A1 | 12/2004 | Chu et al. |
| 2006/0082222 A1 | 4/2006 | Pincu et al. |
| 2006/0230407 A1 | 10/2006 | Rosu et al. |
| 2006/0236100 A1 | 10/2006 | Baskaran et al. |
| 2008/0052480 A1 | 2/2008 | Satoyama et al. |
| 2008/0313476 A1 | 12/2008 | Hansen |
| 2009/0199193 A1 | 8/2009 | Jackson |
| 2010/0217865 A1 | 8/2010 | Ferris |
| 2011/0055378 A1 | 3/2011 | Ferris et al. |
| 2011/0099147 A1 | 4/2011 | Mcalister et al. |
| 2011/0154500 A1 | 6/2011 | Sahita et al. |
| 2011/0307570 A1* | 12/2011 | Speks ............... H04L 41/00 709/208 |
| 2012/0047328 A1 | 2/2012 | Williams et al. |
| 2012/0222084 A1 | 8/2012 | Beaty et al. |
| 2013/0007710 A1 | 1/2013 | Vedula et al. |
| 2013/0311434 A1 | 11/2013 | Jones |
| 2013/0332901 A1 | 12/2013 | Berg et al. |
| 2013/0346718 A1 | 12/2013 | Meshchaninov et al. |
| 2014/0007097 A1 | 1/2014 | Chin et al. |
| 2014/0149635 A1 | 5/2014 | Bacher et al. |
| 2014/0165063 A1 | 6/2014 | Shiva et al. |
| 2014/0223233 A1 | 8/2014 | Heyrman et al. |
| 2014/0279884 A1 | 9/2014 | Dantkale et al. |
| 2014/0282820 A1 | 9/2014 | Walton et al. |
| 2014/0359356 A1 | 12/2014 | Aoki |
| 2015/0106165 A1 | 4/2015 | Rai et al. |
| 2015/0220455 A1 | 8/2015 | Chen et al. |
| 2015/0317173 A1 | 11/2015 | Anglin |
| 2015/0381426 A1 | 12/2015 | Roese et al. |
| 2016/0062441 A1 | 3/2016 | Chou et al. |
| 2016/0180087 A1 | 6/2016 | Edwards et al. |
| 2016/0224903 A1 | 8/2016 | Talathi et al. |
| 2016/0259665 A1 | 9/2016 | Gaurav et al. |
| 2017/0034012 A1 | 2/2017 | Douglas et al. |
| 2017/0041184 A1 | 2/2017 | Broz et al. |
| 2017/0048200 A1 | 2/2017 | Chastain |
| 2017/0097851 A1 | 4/2017 | Chen |
| 2017/0118247 A1 | 4/2017 | Hussain |
| 2017/0195201 A1 | 7/2017 | Mueller et al. |
| 2017/0201574 A1 | 7/2017 | Luo |
| 2018/0024964 A1 | 1/2018 | Mao |
| 2018/0063145 A1 | 3/2018 | Cayton et al. |
| 2019/0065061 A1 | 2/2019 | Kim et al. |
| 2019/0065256 A1 | 2/2019 | Hamilton et al. |
| 2019/0079837 A1 | 3/2019 | Agarwal et al. |
| 2019/0164087 A1 | 5/2019 | Ghibril et al. |
| 2019/0188014 A1 | 6/2019 | Easterling et al. |
| 2019/0190778 A1 | 6/2019 | Easterling et al. |
| 2019/0205180 A1 | 7/2019 | Macha et al. |
| 2019/0227616 A1 | 7/2019 | Jenne et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1 | 12/2019 | Bernat et al. |
| 2019/0384648 A1 | 12/2019 | Wiggers et al. |
| 2019/0386902 A1 | 12/2019 | Mueller et al. |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0034528 A1 | 1/2020 | Yang et al. |
| 2020/0044966 A1 | 2/2020 | Krishnan et al. |
| 2020/0065254 A1 | 2/2020 | Cao et al. |
| 2020/0097358 A1 | 3/2020 | Mahindru et al. |
| 2020/0174949 A1 | 6/2020 | Ramasamy et al. |
| 2020/0218561 A1 | 7/2020 | Lal et al. |
| 2020/0233582 A1 | 7/2020 | Chen et al. |
| 2020/0293375 A1 | 9/2020 | Klein |
| 2020/0341786 A1 | 10/2020 | Soryal |
| 2020/0341798 A1* | 10/2020 | Duleba ............... G06F 9/45558 |
| 2020/0351221 A1 | 11/2020 | Subramani et al. |
| 2020/0356200 A1 | 11/2020 | Blanco et al. |
| 2020/0358714 A1 | 11/2020 | Singleton, IV et al. |
| 2021/0019062 A1 | 1/2021 | Fessel |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1 | 4/2021 | Cui et al. |
| 2021/0117441 A1 | 4/2021 | Patel et al. |
| 2021/0152659 A1 | 5/2021 | Cai et al. |
| 2021/0224093 A1 | 7/2021 | Fu et al. |
| 2021/0367901 A1 | 11/2021 | Singh et al. |
| 2021/0397494 A1 | 12/2021 | Graham |
| 2022/0179701 A1 | 6/2022 | Saad et al. |
| 2022/0197773 A1* | 6/2022 | Butler ............... G06F 9/5038 |
| 2023/0026690 A1 | 1/2023 | Dawkins et al. |
| 2023/0033296 A1 | 2/2023 | Shetty et al. |

OTHER PUBLICATIONS

International Search Report dated Aug. 9, 2021, issued in corresponding PCT Application No. PCT/US2021/029698 (5 pages).
Written Opinion of the International Searching Authority dated Aug. 9, 2021, issued in corresponding PCT Application No. PCT/US2021/029698 (10 pages).
International Search Report dated Jul. 19, 2021, issued in corresponding PCT Application No. PCT/US2021/029687 (2 pages).
Written Opinion of the International Searching Authority dated Jul. 19, 2021, issued in corresponding PCT Application No. PCT/US2021/029687 (9 pages).
International Search Report dated Oct. 21, 2021, issued in corresponding PCT Application No. PCT/US2021/029708 (5 pages).
Written Opinion of the International Searching Authority dated Oct. 21, 2021, issued in corresponding PCT Application No. PCT/US2021/029708 (7 pages).
International Search Report dated Aug. 19, 2021, issued in corresponding PCT Application No. PCT/US2021/029702 (5 pages).
Written Opinion of the International Searching Authority dated Aug. 19, 2021, issued in corresponding PCT Application No. PCT/US2021/029702 (8 pages).
Alachiotis, Nikolaos, et al. "dReDBox: A Disaggregated Architectural Perspective for Data Centers", Hardware Accelerators in Data Centers; Springer International Publishing AG, pp. 35-56. (Year: 2019).
Mohammadi et al, Towards an end-to-end architecture, Towards an end-to-end architecture, 2018, pp. 514-518, 44th Euromicro Conference (5 pages).

(56) References Cited

OTHER PUBLICATIONS

Chunlin, Li, Tang Jianhang, and Luo Youlong, Hybrid cloud adaptive scheduling strategy for heterogeneous workloads, Hybrid cloud adaptive scheduling strategy for heterogeneous workloads, Year: 2019, pp. 419-446, Journal of Grid Computing 17 (28 pages).

* cited by examiner

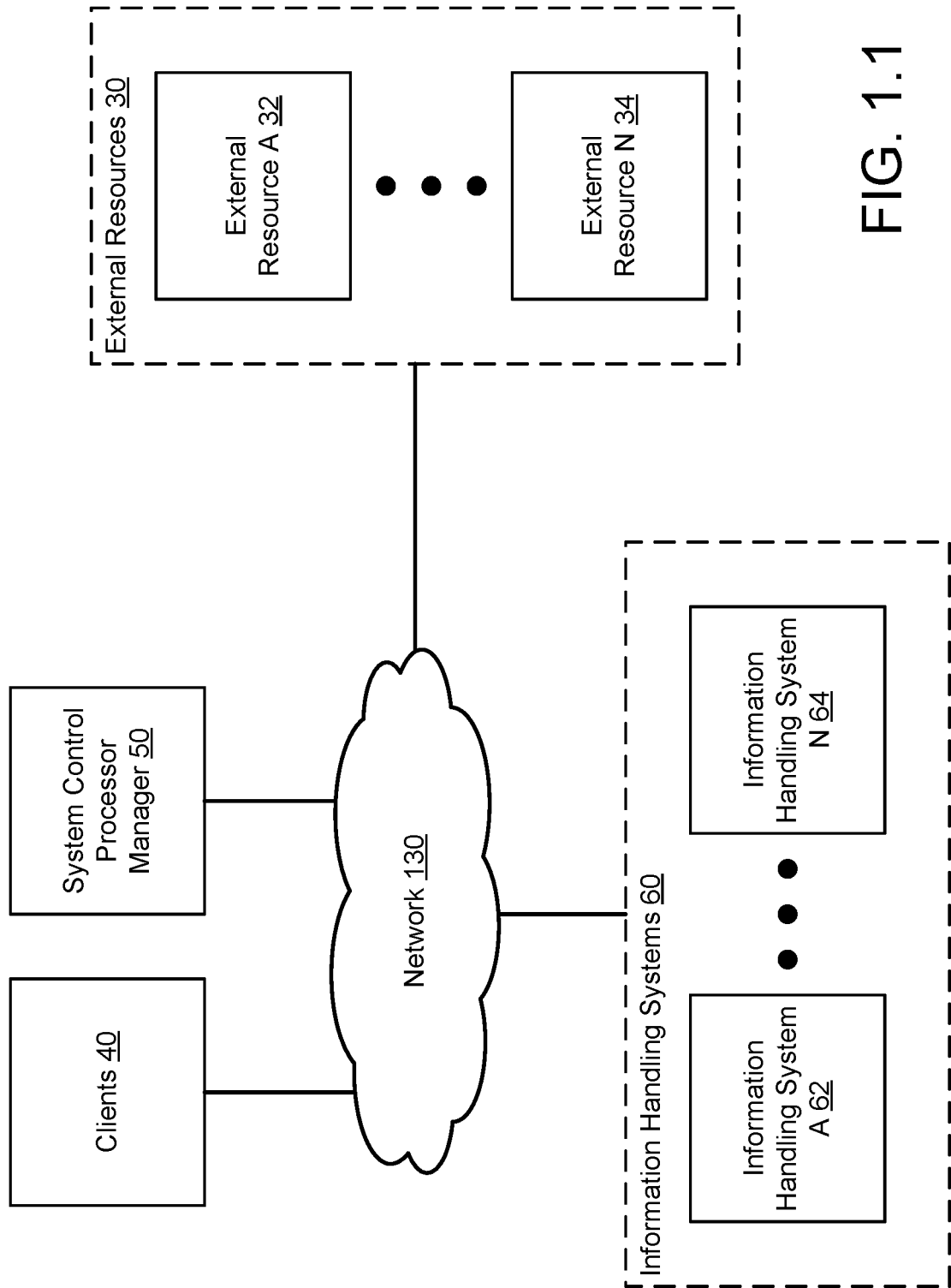
FIG. 1.1

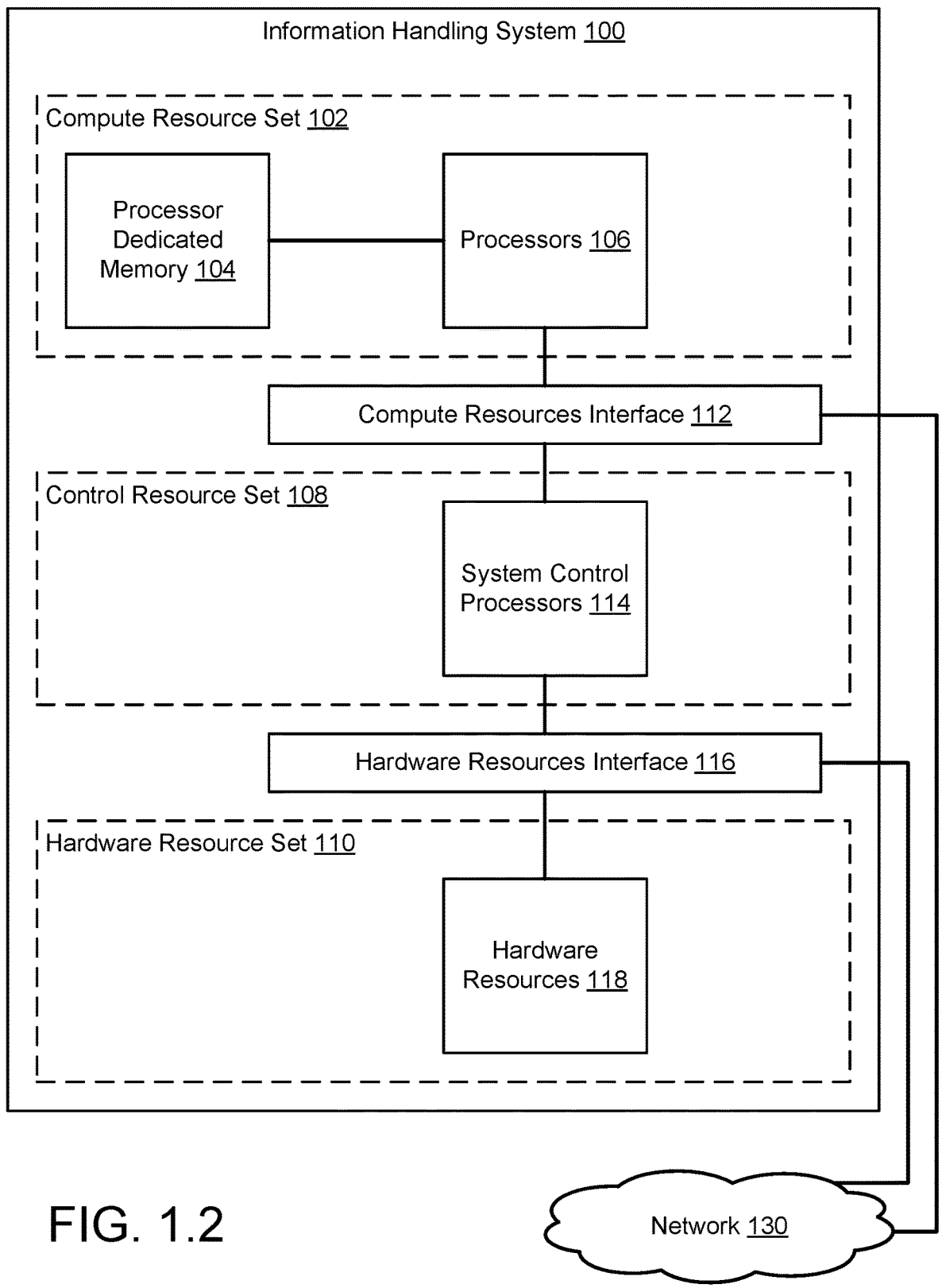
FIG. 1.2

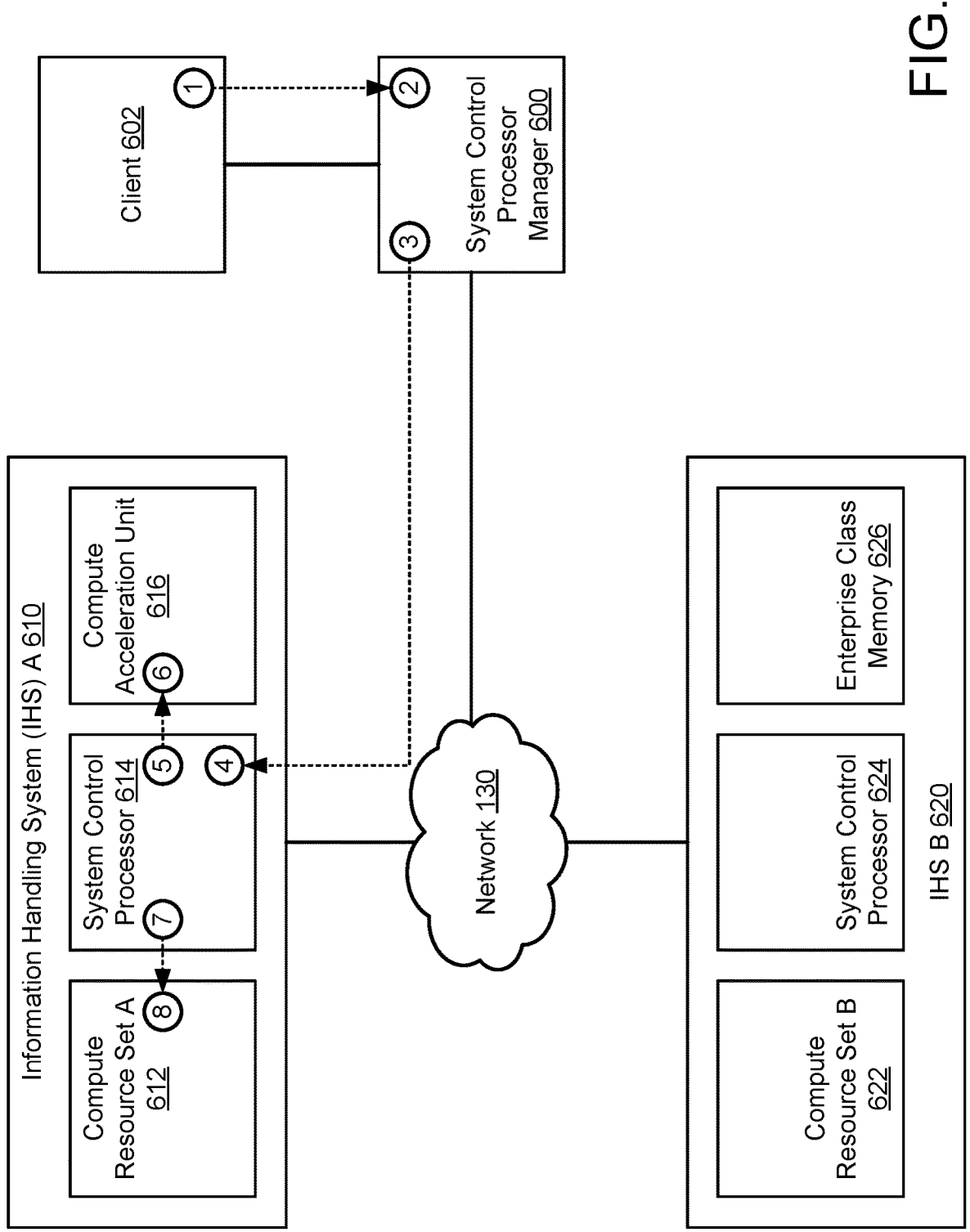
FIG. 6.1

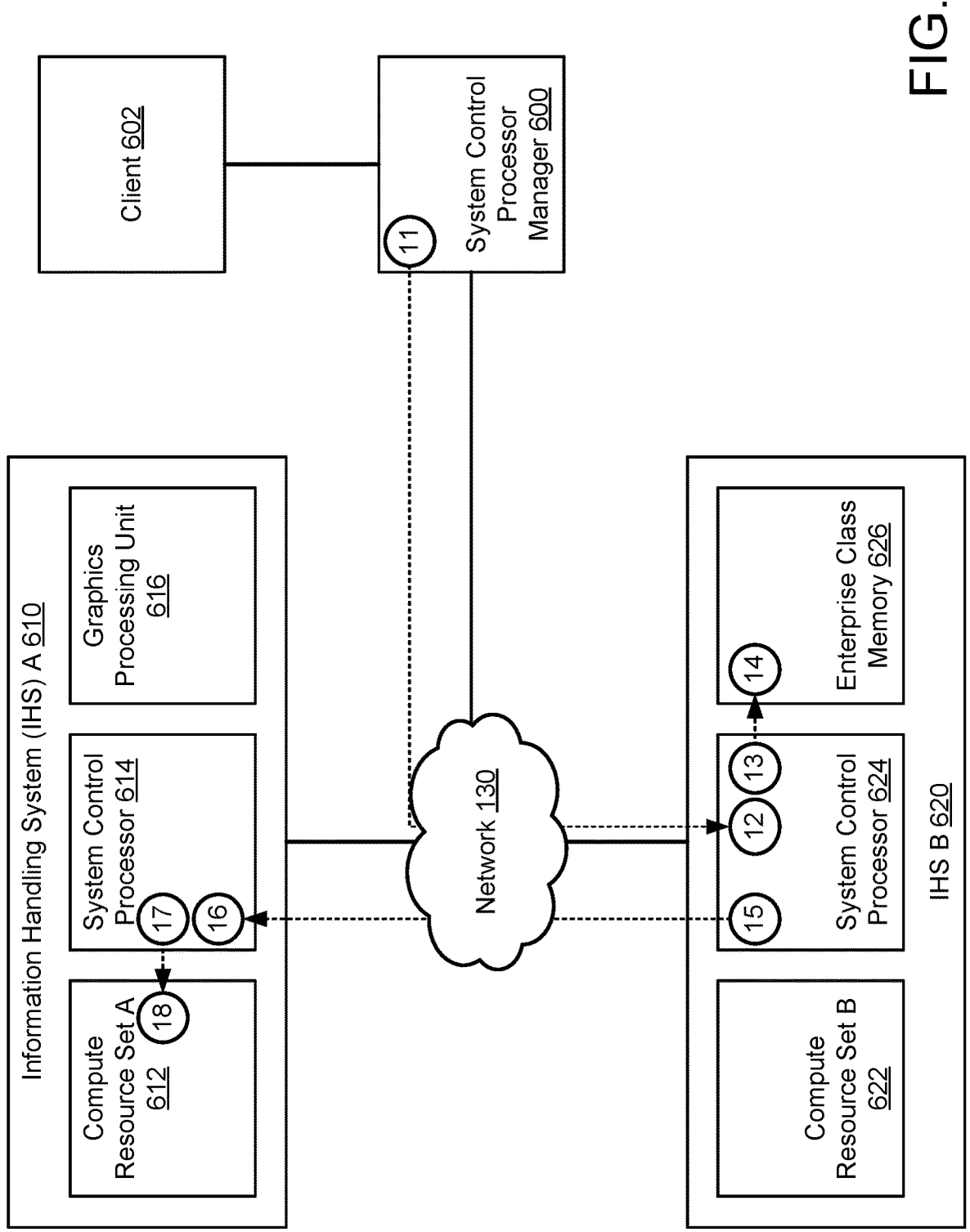
FIG. 6.2

SYSTEM AND METHOD FOR ALLOCATING RESOURCES TO PERFORM WORKLOADS

BACKGROUND

Computing devices may provide services. To provide the services, the computing devices may include hardware components and software components. The services provided by the computing devices may be limited by these components.

SUMMARY

In one aspect, a system control processor manager for servicing workloads using composed information handling systems instantiated using information handling systems in accordance with one or more embodiments of the invention includes persistent storage and a workload manager. The workload manager obtains a workload request for a workload of the workloads; predicts future resource needs for the workload during a future time period; makes a determination that a portion of free resources of the information handling systems are available to meet the future resource needs; reserves the portion of the free resources based on the determination to obtain reserved resources during the future time period; and composes a composed information handling system of the composed information handling systems using the reserved resources during the future time period to service the workload request.

In one aspect, a method for servicing workloads using composed information handling systems instantiated using information handling systems in accordance with one or more embodiments of the invention includes obtaining a workload request for a workload of the workloads; predicting future resource needs for the workload during a future time period; making a determination that a portion of free resources of the information handling systems are available to meet the future resource needs; reserving the portion of the free resources based on the determination to obtain reserved resources during the future time period; and composing a composed information handling system of the composed information handling systems using the reserved resources during the future time period to service the workload request.

In one aspect, a non-transitory computer readable medium in accordance with one or more embodiments of the invention includes computer readable program code, which when executed by a computer processor enables the computer processor to perform a method for servicing workloads using composed information handling systems instantiated using information handling systems. The method includes obtaining a workload request for a workload of the workloads; predicting future resource needs for the workload during a future time period; making a determination that a portion of free resources of the information handling systems are available to meet the future resource needs; reserving the portion of the free resources based on the determination to obtain reserved resources during the future time period; and composing a composed information handling system of the composed information handling systems using the reserved resources during the future time period to service the workload request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIGS. 6.1-6.2 show diagrams of the operation of an example system over time in accordance with one or more embodiments of the invention.

DETAILED DESCRIPTION

Figure 2:
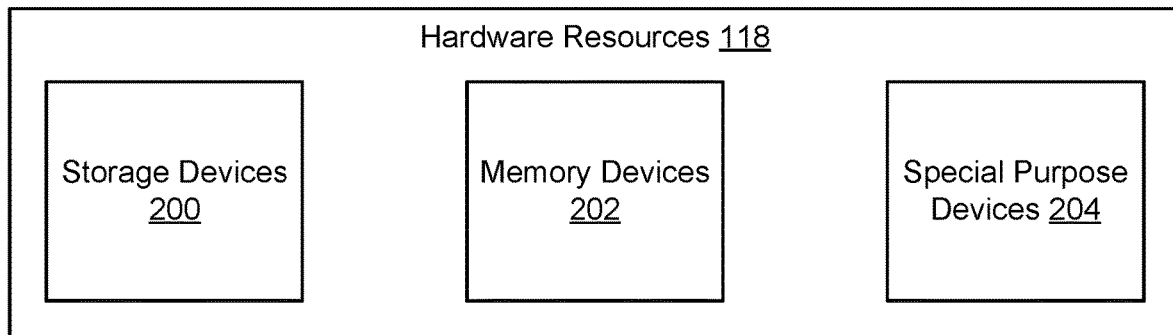
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services by performing corresponding workloads. The computing resources may include, for example, processing resources, memory resources, storage resources, communications resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling systems for performance of corresponding computer implemented services.

To manage computing resource allocation, the system may utilize a reservation system that allows various computing resources of the system to be reserved over time. By allowing computing resources to be reserved, the computing resources may be allocated to composed information handling systems as the computing resources required for performing workloads changes over time. For example, many types of computer implemented services may impose workloads that change over time due to, for example, the number of users utilizing the services, the quantity of data maintained by the services, etc.

To manage the reservation of computing resources for performing workloads, the system may generate predictions of the likely computing resource needs (e.g., future resource needs) of workloads over time. The predictions may specify the likely computing resources needs for performing corresponding workloads over periods of time into the future. The predictions may be used to determine when and for what durations of time to reserve computing resources.

As the computing resources likely to be required for the performance of computing resources changes, unrequired computing resources may be deallocated thereby freeing them for allocation for performance of other computer implemented services. Consequently, a system in accordance with embodiments of the invention may reduce the likelihood of over-provisioning of computing resources thereby resulting in inefficient computing resource utilization (e.g., idle computing resources).

Because the system may have a limited number of computing resources available for allocation, only a finite number of computer implemented services may be concurrently performed by the system. Conflicts may be resolved by the system by prioritizing the performance of various workloads. For example, the system may limit the ability of computing resources to be reserved unless the workloads for which the computing resources are reserved have higher priorities than other workloads for which the computing resources may also attempt to be reserved.

By doing so, embodiments of the invention may reduce the likelihood of over-provision for the performance of workloads while still also making it likely that desired workloads will have access to sufficient quantities of computing resources for performance. Accordingly, computer implemented services provided using a system in accordance with embodiments of the invention may be more likely to meet the expectations of the entities requesting the services.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

Any of these services may impose workloads on various components of the information handling systems. Due to the limited quantity of computing resources of the information handling systems, only a limited number and size of workloads may be performed at any point in time.

The information handling system of the system of FIG. 1.1 may operate independently and/or cooperatively to provide the computer implemented services by performing various workloads. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided thereby placing different types and magnitudes of workloads on the information handling systems (60). For example, some types of computer implemented services may be more compute intensive (e.g., modeling) while other computer implemented services may be more storage intensive (e.g., database) thereby having different computing resource requirements for these different services. Consequently, the ability to perform workloads may not be predicated entirely on the number of workloads being performed. Rather, a single type of computing resource may limit the performance of concurrently workloads even if other types of computing resources are abundant.

Clients (40) may request that the computer implemented services be provided. For example, the clients (40) may send requests to management entities to have the computer implemented services be provided. Consequently, the number and types of workloads to be performed over time may change.

In general, embodiments of the invention relate to systems, methods, and devices for managing the hardware resources of the information handling systems (62) and/or other resources (e.g., external resources (30)) to provide computer implemented services. The hardware resources of the information handling systems (62) may be managed by instantiating one or more composed information handling systems using the hardware resources of the information handling systems (60), external resources (30), and/or other types of hardware devices operably connected to the information handling systems (60). Consequently, the computing resources allocated to a composed information handling system may be tailored to the specific needs of the services and corresponding workloads that will be provided by the composed information handling system.

However, due to the limited number of hardware resources of the information handling system, only a limited number of composed information handling systems may be instantiated at any point in time. Accordingly, the allocation of computing resources to composed information handling systems may need to be rationed so that other composed information handling systems may be instantiated to provide other services.

In one or more embodiments of the invention, the system includes a system control processor manager (50). The system control processor manager (50) may provide composed information handling system composition services. Composed information handling system composition services may include (i) obtaining requests for computer implemented services from the clients (40) (e.g., composition requests which may require instantiation of a composed information handling system to service the requests), (ii) predicting future computing resource needs for satisfying the requests for the computer implemented services, and (iii) resolving computing resource allocation conflicts when insufficient computing resources are available for allocation to composed information handling systems to provide the computer implemented services. By doing so, the quality of computer implemented services provided by the system of FIG. 1.1 may be improved by, for example, reducing over-provisioning of resources which may prevent other services from being provided, reducing under-provisioning of resources by predicting future computing resource needs thereby improving the quality of provided computer implemented services, and/or managing client expectations regarding services thereby improving a user experience by users who utilize provided computer implemented services.

To resolve conflicts, the system control processor manager (50) may (i) limit (e.g., using a reservation system) for which services various hardware devices may be allocated, (ii) prioritize some types of services over others for allocation purposes, and (iii) deallocate resources from some composed information handling systems and allocate them to other composed information handling systems based on the service prioritization. When computing resources are likely to be plentiful in the future, computing resources may be freely allocated to composed information handling systems without resolving conflicts (e.g., by no longer requiring or utilizing computing resource reservations and/or allocation limitations).

To determine when it is likely that conflicts may arise, the system control processor manager (50) may predict the likely computing resource needs in the future. The predictions may be used to determine when to limit computing resource allocation, how to limit computing resource allocation, and when to deallocate resources to obtain additional computing resources for allocation purposes. To generate the predictions, the system control processor manager (50) may implement any number and type of predictive algorithm including, for example, machine learning, stochastic methods, heuristic learning, global minimization, and/or other types of predictive algorithms. The output of these algorithms may be the likely future computing resource needs for workloads that will be performed by composed information handling systems.

To predict the future computing resources needs for providing various computer implemented services, the system control processor manager (50) may instruct the system control processors of composed information handling systems to monitor the use of hardware resources for providing computer implemented services over time. This information may be used, for example, to ascertain when it is likely that various computing resources will be in high demand in the future. For example, the observed information may be used to train the predictive algorithms. Consequently, the predictions generated by the predictive algorithms may reflect the operation and workloads performed by the system of FIG. 1.1.

In one or more embodiments of the invention, the system control processor manager (50) instantiates composed information handling systems and recomposes composed information handling systems (e.g., allocates additional computing resources to and/or deallocates computing resource from the composed information handling systems) in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model. These resource sets may be managed in accordance with the resource reservation system, allocation limitations, etc. discussed above.

By logically dividing the computing resources of an information handling system into these resource sets, different quantities and types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system. Accordingly, these functionalities may be allocated to composed information handling systems using the corresponding computing resources.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model.

For example, workload monitors may be deployed in control resource sets to monitor the use of the other resource sets for performing various workloads to provide desired computer implemented services. Accordingly, use of these computing resources may be uniformly monitored across the information handling systems (60) to obtain information usable to generate predictions of future computing resource needs. As noted above, these predictions may be utilized to ration computing resources as well as resolve computing resource allocation conflicts. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system thereby placing a workload on the computing resources. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may monitor the utilization of computing resources for providing computer implemented services, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. Accordingly, by utilizing system control processors to monitor the use of the computing resources of a composed information handling system, applications or other entities hosted by the composed information handling system may not be able to view, be aware, impact, or otherwise influence the collection of computing resource use data.

After a composed information handling system is composed, it may be recomposed by adding or removing computing resources from it. As discussed above, embodiments of the invention provide for the dynamic modification of computing resources allocated to composed information handling systems. These computing resources may be added or removed in accordance with, for example, the workloads that are likely (e.g., predicted) to be performed in the future. Consequently, computing resources may be allocated to a composed information handling system prior to and during periods in which a workload may be performed and may be deallocated from the composed information handling system outside of the periods of time in which the workload likely will not be performed.

Additionally, computing resources may be deallocated from a composed information handling system when there are limited quantities of computing resources available for allocation and workloads that will be performed by other composed information handling systems have higher priorities than the workload. Accordingly, composed information handling systems may be recomposed to remove computing resources even when workloads that could benefit from the computing resources are likely to be performed.

In some embodiments of the invention, the system control processor manager (50) may receive requests for performance of workloads for which the system has insufficient computing resources. For example, a request for performance of instant messaging services may be received while all of the computing resources of the system of FIG. 1.1 are being utilized to provide higher priority database services. In such a scenario, the system control processor manager (50) may take action to remediate the request by, for example, notifying the requesting entity that the services cannot be provided, identifying other periods of time during which the system will likely have sufficient computing resources to provide both services concurrently and time shift the instant messaging services to the aforementioned time period, time shift all or a portion of the database services, and/or perform other actions to satisfy the workload performance request. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) by the clients (40) may also be efficiently and transparently monitored.

Different external resources (e.g., 32, 34) may provide similar or different computing resources. For example, some external resources may include large numbers of hard disk drives to provide storage resources while others may include graphics processing unit rendering farms. The external resources (30) may include any number and type of computing resources for allocation to composed information handling systems via system control processors of control resource sets.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the method illustrated in FIG. 5. The clients (40), system control processor manager (50), information handling systems (60), and/or external resources (30) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented service. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The control resource set (108) may also enable the utilization of any of the hardware components of the information handling system (100) by respective clients. When a composed information handling system is instantiated, it (and its hardware devices) may be utilized by a client (e.g., to provide desired computer implemented services by performing corresponding workloads). For example, the client may cause the composed information handling system to execute applications on the compute resource set (102) which, in turn, may utilize any number of hardware resource sets (e.g., 110) as part of their execution.

Because the control resource set (108) may mediate utilization of hardware resource sets (110) by compute resource sets (102), the control resource set (108) may transparently ascertain the use of the hardware devices of these resource sets. To do so, the control resource set (108) may intercept (as part of presenting computing resources of hardware resource sets to compute resource sets) communications between resource sets, monitor workloads being performed by each of the respective resource sets, monitor power utilization by these resource sets, and/or may perform other actions to identify the performance and ability of workloads to be performed over time.

The collected workload information may be provided to the system control processor manager of FIG. 1.1 or other entities. As noted above, the system control processor manager may utilize the collected information to ascertain likely computing resource needs in the future for performing various workloads.

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resources interface (112), which is also connected to the system control processors (114). The compute resources interface (112) may enable the processors (106) to communicate with other entities via bare metal communications. Also, the compute resources interface (112) may enable system control processors (114) of the control resource set (108) to monitor the activity of the processors (106) and/or processor dedicated memory (104) to identify use of these hardware devices by clients. For example, the compute resources interface (112) may support sideband communications to the hardware devices of the compute resource set (102) thereby enabling utilization information for these hardware devices to be obtained by the system control processors (114).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., computing resources of the hardware resource set (110), external resources, other hardware resource sets of other information handling systems, etc.) to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model such as secured communications using a virtual private network, data storage model such as storing multiple copies of data or adding error correction code data to stored data, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, the control plane entities may be an indirect users of hardware devices and computing resources provided thereby. In the information handling system of FIG. 1.2, the system control processors (114) may present, as bare metal resources, abstracted resources, indirection layers, virtualization layers, etc.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106). Consequently, these entities may not be able to interfere with monitoring of the use of these resources. In contrast, if an agent or other entity for monitoring computing resource use rates is executing using the processors (106), other entities executing using the processors (106) may be able to interfere with the operation of the monitoring entity. Accordingly, embodiments of the invention may provide a method of monitoring computing resources use that is less susceptible to interference by other entities.

Figure 3:
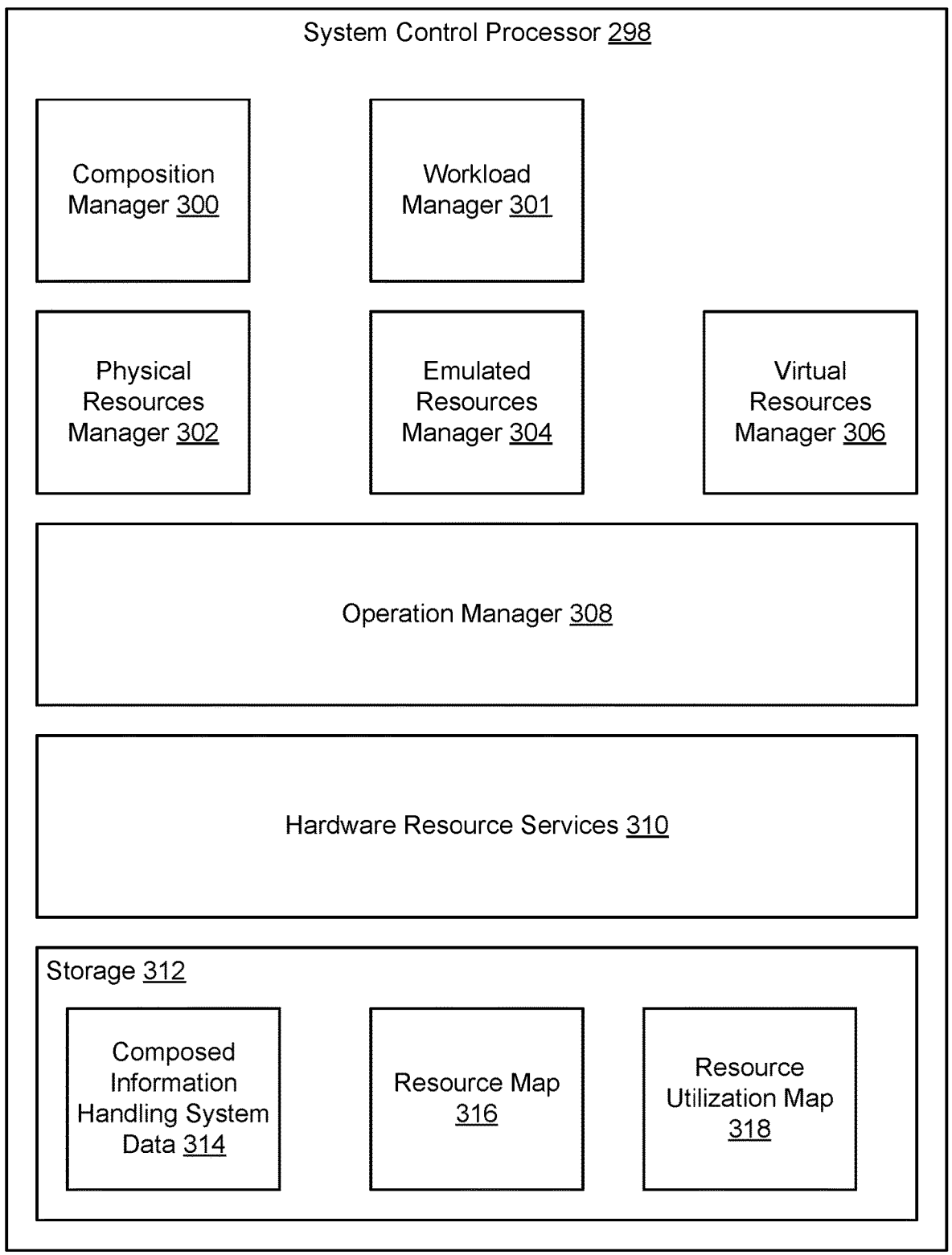
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor the operations of these other devices to identify the workloads being performed by composed information handling systems using these hardware devices.

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIG. 5.

The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling systems may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204). The hardware resources (118) may include different numbers and types of devices than those illustrated in FIG. 2 without departing from the invention.

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models (e.g., storing multiple copies of data), security models (e.g., encrypting stored data), workload performance availability models (e.g., executing multiple instances of workloads when only a single instance is required), reporting models (e.g., obtaining information regarding the performance of workloads, health metrics of the hardware devices, etc.), etc. For example, the system control processors may instantiate redundant performance of workloads for high availability services so that if one of the workload instances fails to complete the output of another instance may be used to satisfy a workload request.

The manner of operation of these devices may be transparent to the computing resource sets utilizing these hardware devices for providing computer implemented services. Consequently, even though the resulting composed information handling system control plane may be unaware of the implementation of the management of these hardware resources (118), the composed information handling systems may still operate in accordance with these management methods thereby providing a unified method of managing the operation of composed information handling systems.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation, recomposition, and operation of composed information handling systems. By doing so, a system that includes information handling systems may dynamically instantiate and/or recompose composed information handling systems to provide computer implemented services.

To instantiate and operate composed information handling systems, the system control processor (298) may include a composition manager (300), a workload manager (301), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating, recomposing, and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition/recomposition requests for composed information handling systems, (iv) based on the composition/recomposition requests, prepare and present resources as bare metal resources to compute resource sets, (v) instantiate applications in composed information handling systems to cause the composed information handling systems to provide computer implemented services, (vi) manage the operation of the composed information handling systems by, for example, managing hardware devices of hardware resource sets in accordance with various management models, (vii) add/remove/modify resources presented to the compute resource sets of composed information handling systems dynamically in accordance with workloads being performed by the composed information handling systems and/or workloads that are likely to be performed in the future, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components (e.g., hardware devices) of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system and/or changes in existing computing resource allocations.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services by performing corresponding workloads.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

Figure 5:
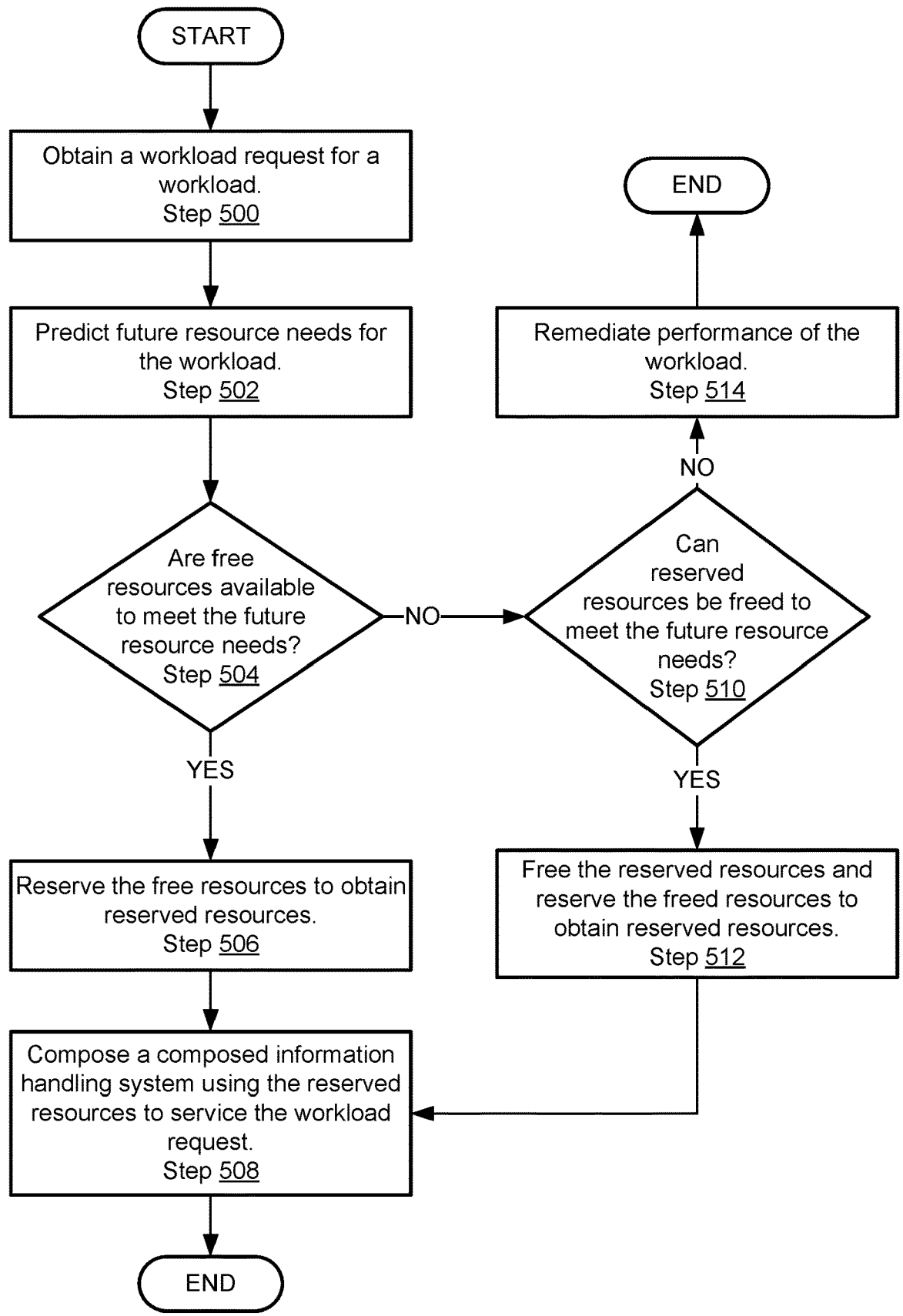
FIG. 5 shows a flowchart of a method of composing one or more composed information handling systems to provide computer implemented services in accordance with one or more embodiments of the invention.

When providing its functionality, the composition manager (300) may perform all, or a portion, of the methods illustrated in FIG. 5.

After a composed information handling system is formed, a client may begin to utilize the hardware devices of the composed information handling system via use of computer implemented services provided using the hardware devices. The workload manager (301) may monitor the use of these hardware devices for performing workloads of the computer implemented services.

To do so, the workload manager (301) may (i) monitor the components of the compute resource sets including the actions being performed, power being consumed, communications sent, etc., (ii) monitor communications from the compute resource sets destined for other hardware devices (e.g., of hardware resource sets, other compute resource sets of other information handling systems, external resources, etc.) by intercepting them as they traverse the system control processor (298), (iii) store information regarding the use of computing resources for performing workloads overtime in a resource utilization map (318), (iv) provide computing resource use information to other entities such as system control processor managers, and (v) perform other actions under the direction of management entities to help the management entities (e.g., system control processor managers) to generate estimates/predictions of the computing resources that will be necessary to be allocated in the future to perform workloads that composed information handling systems will likely perform in the future. By doing so, the management entities may be able to generate better predictions. Consequently, the management entities may be better able to allocate the limited computing resources of the system of FIG. 1.1 for providing computer implemented services. The resulting computer implemented services may be of a higher quality, may limit or prevent phantom slowdowns due to lack of computing resources for performance of workloads, and/or may otherwise improve a quality of a user's experience regarding the provided computer implemented services.

When providing its functionality, the workload manager (301) may perform all, or a portion, of the method illustrated in FIG. 5.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding TO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), workload manager (301), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, of the method illustrated in FIG. 5.

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the method illustrated in FIG. 5. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, any of the composition manager (300), workload manager (301), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), workload manager (301), physical resources manager (302), emulated resources manager (304), virtual resources manager (306), operation manager (308), and/or hardware resource services (310). The composition manager (300), workload manager (301), physical resources manager (302), emulated resources manager (304), virtual resources manager (306), operation manager (308), and/or hardware resource services (310) may be implemented using other types of hardware devices without departing from the invention.

In one or more embodiments of the invention, any of the composition manager (300), workload manager (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), workload manager (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316), and a resource utilization map (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The resource utilization map (318) may be implemented using one or more data structures that includes information regarding the utilization of hardware devices of the composed information handling systems for performing workloads. For example, the resource utilization map (318) may specify identifiers of workloads, identifiers of hardware components used to perform the workloads, and other types of information that may be used to establish relationships between workloads and the computing resources used to perform the workloads over time.

The resource utilization map (318) may specify the computing resource utilization over time via any method. For example, the resource utilization map (318) may specify a quantity of computing resource utilization, computing resource utilization rates over time, power consumption of hardware devices that provide the computing resources used to perform workloads, etc. The resource utilization map (318) may include other types of information used to quantify the use of computing resources for performing workloads without departing from the invention.

The resource utilization map (318) may be maintained by, for example, the workload manager (301). For example, the workload manager (301) may add, remove, and/or modify information included in the resource utilization map (318) to cause the information included in the resource utilization map (318) to reflect the consumption of computing resource for performing workloads over any period(s) of time.

The data structures of the resource utilization map (318) may be implemented using, for example, lists, tables, unstructured data, databases, etc. While illustrated in FIG. 3 as being stored locally, the resource utilization map (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
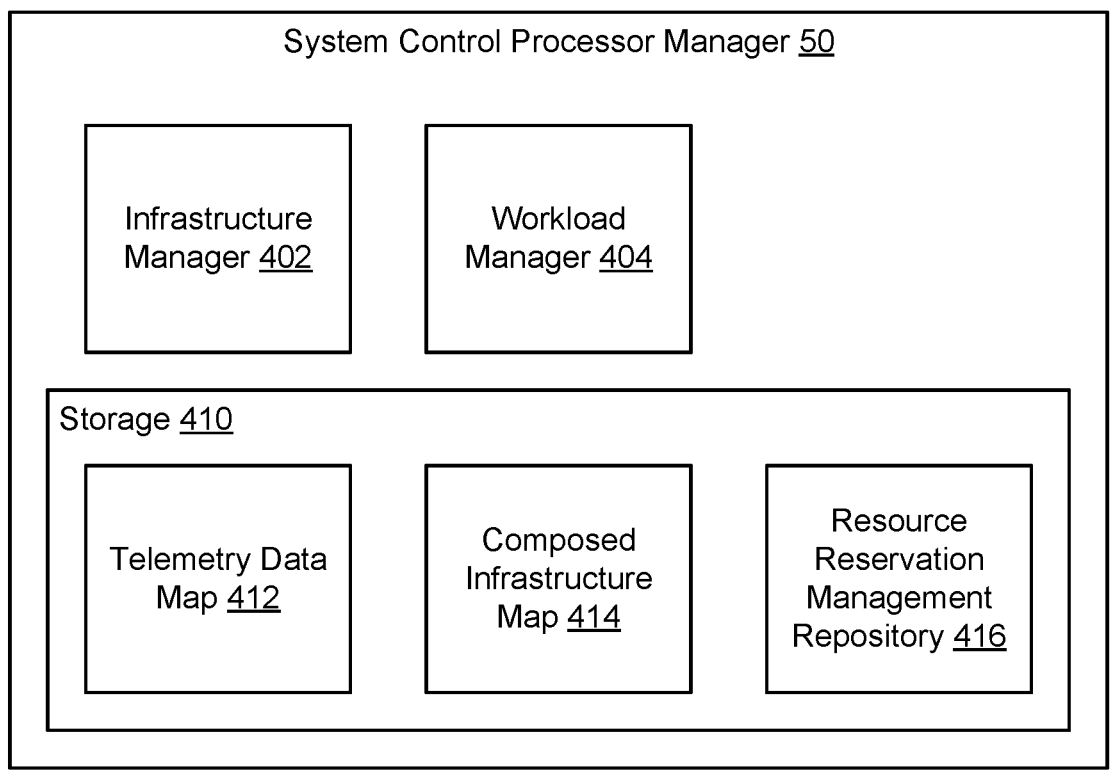
FIG. 4 shows a diagram of a system control processor manager in accordance with one or more embodiments of the invention.

As discussed above, a system control processor manager may cooperate with system control processors of control resource sets to instantiate and/or recompose composed information handling systems by presenting computing resources from hardware resource sets to processors of compute resource sets as bare metal resources. FIG. 4 shows a diagram of the system control processor manager (50) in accordance with one or more embodiments of the invention.

The system control processor manager (50) may manage the process of instantiating and/or recomposing composed information handling systems to manage the performance of workloads for computer implemented services. To do so, the system control processor manager (50) may include an infrastructure manager (402), workload manager (404), and storage (410). Each of these components is discussed below.

The infrastructure manager (402) may provide composition and/or recomposition services. These services may include obtaining composition/recomposition requests for composed information handling systems, determining the resources to allocate to instantiate/recompose composed information handling systems, and cooperating with system control processors to allocate the identified resources. By doing so, the infrastructure manager (402) may cause any number of computer implemented services to be provided using the composed information handling systems by managing performance of corresponding workloads for the computer implemented services.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table to match an expressed intent to resources to be allocated to satisfy that intent. The outcome based computing resource requirements lookup table may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests, recompose existing composed information handling systems).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (414). The infrastructure manager (402) and/or workload manager (404) may utilize this information to, for example, decide whether computing resources should be added to or removed from composed information handling system. Consequently, computing resources may be dynamically re-provisioned to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the method illustrated in FIG. 5.

The workload manager (404) may provide computing resource allocation management services. Computing resource allocation management services may include (i) obtaining information regarding performance of workloads that may be used to generate predictions of future computing resources needs for performing the workloads, (ii) if the predictions indicate that the future computing resources needs exceed a predetermined threshold (e.g., if the need will exceed the availability), then the workload manager (404) may begin rationing the allocation of computing resources and/or deallocating computing resources to obtain additional free computing resources that may be allocated, and (iii) if the predictions indicate that the future computing resources needs will exceed those available, the workload manager (404) may take action to remediate the unavailability of computing resources by time-shifting performance of workloads, canceling performance of workloads, and/or taking other types of actions. By doing so, the workload manager (404) may improve the allocation of resources for providing computer implemented services.

The workload manager (404) may obtain computing resource use for workload performance information from any number of composed systems. The aforementioned information may be stored (e.g., in a composed infrastructure map) for future use in generating future computing resource need predictions.

The workload manager (404) may generate predictions of future computing resource needs using any number and type of predictive algorithms. For example, the workload manager (404) may utilize the obtained computing resource use information to predict future computing resource use for performance of workloads during future periods of time. To do so, the workload manager (404) may utilize machine learning or other algorithms. A machine learning model may be trained using previously collected computing resource use information. Once trained, the machine learning model may take, as input, computing resource use information associated with a workload during a first time period and generate, as output, predicted future computing resource use information.

The workload manager (404) may also generate predictions using heuristically obtained information such as, for example, usage pattern and implications based on prior telemetry data and analytics across a collection of composed information handling systems, relationships between workload types (known characteristics) and velocity of computing resource consumption, known peak periods with known implications on computing resource utilization, and/or computing resource predictive failure when there is a desire to keep using the resource until the computing resource fails. The heuristically obtained information may be collected via any number and type of mechanisms without departing from the invention.

As noted above, if the predicted computing resource needs exceed a predetermined threshold, then the workload manager (404) may activate a computing resource reservation system that limits the ability of computing resources to be reserved. The reservation system may not be active while ample computing resources are available for allocation. The reservation system may be dynamically active and/or deactivated overtime.

When the computing resource reservation system is activated, it may limit the ability of any number of hardware devices to be activated based on one or more criteria. The criteria may include, for example, types of workloads, priorities of workloads, and/or other criteria that may be used to limit the allocation of computing resources.

For example, in some embodiments of the invention, different types of workloads may be given different priorities. When the reservation system is active, different types of hardware devices may only be allocated for performance of workloads having sufficiently high priority. Allocation of any number and type of hardware devices may be limited to corresponding priority levels. The priority levels of different types of workloads may be set (e.g., by an administrator) via any method without departing from the invention.

In another example, in some embodiments of the invention, various hardware devices may be reserved for performance of specific workload types and/or workload priorities. When the reservation system is active, these devices may only be allocated to composed information handling systems that will be performing the corresponding workload type and/or with corresponding priority.

To make these determinations regarding the operation of the computing resources reservation system, the workload manager (404) may utilize a resource reservation management repository (416). The resource reservation management repository (416) may specify any restrictions on allocation of computing resources to composed information handling systems. When the infrastructure manager (402) is tasked with servicing a workload by instantiating or recomposing a composed information handling system, the infrastructure manager (402) may request a list of available computing resources for performance of the workloads from the workload manager (404). Consequently, the infrastructure manager (402) may be limited in its ability to allocate computing resources in accordance with the computing resources reservation system.

To limit allocation of computing resources, the workload manager (404) may consider the future computing resource needs of various workloads and reserve the computing resources in the future. These computing resource reservations may be stored in the resource reservation management repository (416). Consequently, when the infrastructure manager (402) requests a list of computing resources available for allocation, the workload manager (404) may take into account the future computing resource need by preventing computing resources that will be needed for use in the future to be allocated to other composed information handling systems during those future periods of time.

For example, the workload manager (404) may maintain a reservation calendar in the resource reservation management repository (416). The reservation calendar may specify when computing resources have been reserved over time. The workload manager (404) may prevent computing resources to be allocated if the allocations would conflict with the computing resource reservations maintained in the reservation calendar.

If a computing resource reservation conflict arises, then the workload manager (404) may resolve the conflict based on, for example, the priorities of the workloads that are in conflict. Consequently, computing resource reservation conflicts may be addressed prior to the conflict arising.

When providing its functionality, the workload manager (404) may perform all, or a portion, of the method illustrated in FIG. 5.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), composed infrastructure map (414), and the resource reservation management repository (416). These data structures may be maintained by, for example, the infrastructure manager (402) and/or the workload manager (404). For example, the infrastructure manager (402) and/or workload manager (404) may add, remove, and/or modify information included in these data structures to cause the information included in these data structures to reflect the state of any number of information handling systems, external resources, and/or composed information handling systems.

In some embodiments of the invention, the resource reservation management repository (416) may include tables that specify limitations regarding the allocation of computing resources. For example, consider Table 1 which shows a portion of a priority based reservation table. The priority based reservation table includes limitations in column 2 applied to hardware devices listed in column 1. As seen in row 2, processor 1 is limited to workloads having a priority of 1 (e.g., a high priority) while, in row 3, processor 2 is available to all workloads. Consequently, based on the restrictions in Table 1, only workloads having a priority 1 would be able to reserve processor 1.

TABLE 1

Example priority based reservation table

| Hardware Device | Limitations |
|---|---|
| Processor 1 | Priority 1 workloads |
| Processor 2 | All workloads |

In another example, consider Table 2 which shows a portion of a workload based reservation table. The workload based reservation table includes limitations in column 2 applied to hardware devices listed in column 1. As seen in row 2, storage 1 is limited to computer aided design rendering workloads while, in row 2, storage 2 is available to all types of workloads. Consequently, based on the restrictions in Table 2, only workloads that provide computer aided design rendering functionality would be able to reserve storage 1.

TABLE 2

Example workload based reservation table

| Hardware Device | Limitations |
|---|---|
| Storage 1 | Computer Aided Design Rendering |
| Storage 2 | All workloads |

The resource reservation management repository (416) may include any number and type of tables. Each of the tables may specify limitations regarding reservation of various hardware devices using any type of criteria. Consequently, reservations of hardware devices may be limited based on multi-dimensional criteria (e.g., limited both by type of workload and priority of workload) having any number of dimensions. However, as noted above, in some scenarios these reservation limitations may be relaxed depending on the quantity of free computing resources. For example, if the quantity of free computing resources available for reservation exceeds a predetermined threshold, then the reservation limitations illustrated in Tables 1-2 may be relaxed or not otherwise employed.

For example, consider an example as illustrated in Table 3. Table 3 shows a listing of some of the hardware devices of a system. As seen in column 1, the system includes processors and storages that may be allocated. As seen in column 2, the system includes 10 of each of these devices, while, in column 3, 8 of the processors are free for allocation while only 1 of the storages are free for allocation. Because of the abundant number (i.e., 8) of processors available for allocation, as seen in column 4, there are no limitations being imposed on reservation of the processors. In contrast, because of the limited number (i.e., 1) of storages available for allocation, as seen in column 4, the limitations specified in Table 2 for the storages are being enforced. Consequently, only computer aided design rendering workloads may reserve storage 1 (of the 10 storages) while storage 2 may still be freely reserved.

TABLE 3

Example listing of free resources

| Hardware Device | Total | Free | Limitation Status |
|---|---|---|---|
| Processors | 10 | 8 | Not limited |
| Storages | 10 | 1 | Limited, refer to Table 2. |

The resource reservation management repository (416) may utilize any number of tables similar to those shown in Tables 1-3 above to manage the process of reserving and managing computing resources.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIG. 5 shows a flowchart of a method in accordance with one or more embodiments of the invention. The method depicted in FIG. 5 may be performed to provide computer implemented services by performing requested workloads in accordance with one or more embodiments of the invention. The method shown in FIG. 5 may be performed by, for example, a system control processor manager (e.g., 50, FIG. 1.1). Other components of the system in FIG. 1.1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a workload request for a workload is obtained. The workload request may specify, for example, that one or more computer implemented services are to be provided.

The workload request may be obtained from, for example, a client or another entity (e.g., an existing composed information handling system, a management entity, etc.). The workload request may be obtained via a message. The workload request may be obtained via other methods without departing from the invention.

In step 502, future resource needs for the workload are predicted. The prediction may be made, as discussed with respect to FIG. 4, by utilizing a prediction model. The prediction model may specify the likely computing resource needs of the workload over time into the future.

In step 504, it is determined whether free resources available to meet the future resource needs are available. The determination may be made based on the computing resources that are reserved for allocation purposes currently (e.g., already allocated so are not free) and into the future (e.g., reserved for allocation to composed information handling systems at future points/periods in time so that the composed information handling systems may perform other workloads).

For example, as discussed with respect to FIG. 4, even though free computing resources may exist, the free computing resources may not be available for allocation to the workload if the computing resources are reserved. The determination may be made based on information included in the resource reservation management repository (416, FIG. 4) which specifies the computing resources that are limited in their ability to be allocated.

If free resources are available to meet the future resource needs, then the method may proceed to step 506. Otherwise, the method may proceed to step 510.

In step 506, the free computing resources (or a portion necessary to satisfy the computing resource needs of the workload) are reserved to obtain reserved resources. The free computing resources may be reserved in accordance with the predicted future resource needs.

As noted above, the computing resource needs of a workload may change over time. The quantity and/or type of the reserved free computing resources may, consequently, be time dependent. The free computing resources may be reserved by adding corresponding information to a computing resource reservation calendar that specifies reserved computing resources over time into the future.

In step 508, a composed information handling system is composed using the reserved resources to service the workload request. The composed information handling system may be composed by (i) instantiating a new composed information handling system using the reserved computing resources or (ii) recomposing an existing composed information handling system to include the reserved resources.

The method may end following step 508.

Following step 508, the composed information handling system may be recomposed in accordance with the future resource needs using the reserved computing resources. Consequently, the computing resources available to the composed information handling system may scale over time to match those that are likely to be necessary to perform the workload over time.

Returning to step 504, the method may proceed to step 510 following step 504 if free resources are not available to meet the future resource needs.

In step 510, a determination is made regarding whether reserved resources can be freed to meet the future resource needs. The determination may be made by identifying a type of the workload and comparing the type of the workload to other workloads being performed by composed information handling systems (and/or that will be performed during the predicted future resource needs).

The comparison may indicate that an importance, priority, or other metric associated with the type of the workload of the workload request is greater than that of the workload being performed or that will be performed by the other composed information handling systems. If the comparison indicates that the workload should be prioritized over the other workloads, then the determination may be made that the reserved resources can be freed to meet the future resource needs.

For example, consider a scenario where the workload is a database workload having a priority of 1. At a future point in time, the predicted future resource needs for the workload may exceed the computing resource that may be allocated for a composed information handling system in the future.

An existing composed information handling system may be providing instant messaging services that have a priority 2 (lower than that of the database services) and for which processing resources have been reserved at the future point in time. To ascertain whether the reserved processing resources can be freed, the priority of the database workload (i.e., 1) may be compared to the priority of the instant messaging services (i.e., 2). In this scenario, the database workload has a higher priority so it may be determined that the reserved resources can be freed to meet the future resource needs of the workload.

If the reserved resources can be freed, then the method may proceed to step 512. If the reserved resources cannot be freed, then the method may proceed to step 514.

In step 512, the reserved resources are freed and then reserved to obtain reserved resources for the workload. The resources may be freed and then reserved by, for example, modifying information included in a reserved resources management repository (e.g., 416, FIG. 4) to indicate that the resources previously reserved for other workload(s) are now reserved for the workload associated with the workload request.

The method may proceed to step 508 following step 512. Consequently, a composed information handling system may be composed to service the workload request of step 500 using the reserved resources obtained in step 512. The aforementioned composed information handling system may be composed over time to be allocated to the reserved resources of step 512.

Returning to step 510, the method may proceed to step 514 following step 510 if it is determined that the reserved resources cannot be freed to meet the future resource needs.

In step 514, performance of the workload is remediated. Remediating the performance of the workload may ensure that a future performance of the workload meets client expectations.

The performance of the workload may be remediated by, for example, (i) time-shifting performance of the workload to other periods of time during which free and/or reserved resources may be reallocated for performance of the workload, (ii) notifying an entity that requested the workload be performed (e.g., the entities that submitted the workload request) that the workload may be performed at lower or reduced levels of performance, and/or (iii) taking other action that may make performance of the workload acceptable to requesting entities.

The method may end following step 514.

Using the method illustrated in FIG. 5, embodiments of the invention may dynamically allocate computing resources for performance of workloads via allocation to composed information handling systems that will perform the workloads. While performing the workloads, the system may automatically allocate computing resources to and deallocate computing resources from the composed information handling systems thereby resulting in the computing resources allocated to each of the composed information handling systems to mirror the computing resources predicted to be required for performance of the workloads. Consequently, composed information handling systems may not be over-provisioned with computing resources or under-provisioned. Accordingly, embodiments of the invention may improve the quality of provided computer implemented services by ensuring that workloads have access to sufficient quantities of computing resources for performance of the workloads while also ensuring that computing resources are not over-provisioned for the workloads thereby resulting in inefficiently utilized computing resources.

To further clarify embodiments of the invention, a non-limiting example is provided in FIGS. 6.1-6.2. FIGS. 6.1-6.2 show a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIGS. 6.1 and 6.2.

EXAMPLE

Consider a scenario as illustrated in FIG. 6.1 in which a client (602) at a first point in time, at step 1, sends a service request to a system control processor manager (600) that manages two information handling systems (610, 620). The service request specifies that database services are to be provided for the client.

In response to the composition request, the system control processor manager (600), at step 2, generates a prediction regarding the computing resources required for providing the database services. Specifically, the system control processor manager (600) predicts that during a first time period, a compute acceleration unit (616) will be required for providing the database services. However, the system control processor manager (600) also predicts that after a second time period, the workload for providing the database services will require access to enterprise class memory (626) for operating a corresponding cache for the database.

Based on the prediction, the system control processor manager (600) reviews the available computing resources (e.g., 612, 614, 616, 622, 624, 626). Because the enterprise class memory is not immediately required, the system control processor manager (600) reserves the enterprise class memory (626) during the second time period but does not attempt to allocate it for providing the database services during the first time period.

After reserving the enterprise class memory (626), the system control processor manager (600), at step 3, generates and sends a composition request to the system control processor (614) of the information handling system A (610) indicating compute resource set A (612) is to be presented with the compute acceleration unit (616) to instantiate a composed information handling system to provide the database services.

In response to the instructions, at step 4, the system control processor (614) identifies that the compute acceleration unit (616) is to be presented to the compute resource set A (612). To prepare the compute acceleration unit (616) for allocation, at step 5, the system control processor (614) sets the state of the compute acceleration unit (616) consistent with drivers employed by the system control processor (614) for communications purposes. The system control processor (614) then allocates the compute acceleration unit (616) to the composed information handling system, in part, by updating the reservation system to indicate that the compute resource set A (612), the system control processor (614), and the compute acceleration unit (616) are allocated to a composed information handling system performing the database workload.

Once the compute acceleration unit (616) is prepared for presentation, the system control processor (614) at step 7, presents the compute acceleration unit (616) as a bare metal resource to the compute resource set A (612). Consequently, at step 8, the compute resource set A (612) identifies and begins to use the compute acceleration unit (616) by off-loading database related tasks to the compute acceleration unit (616). Accordingly, the composed system begins to provide the requested database services to the client (602).

Turning to FIG. 6.2, as time passes, the size of the database begins to grow (as predicted by the system control processor manager (600)) thereby preventing a cache for the database to continue to be successfully performed without undue delay using the memory of the compute resource set A (612).

At the second point in time and in accordance with the previously made reservation of the enterprise class memory (626), the system control processor manager (600) generates and sends instructions to the system control processor (624) indicating that the enterprise class memory (626) is to be presented to the compute resource set A (612).

In response, at step 12, the system control processor (624) instantiates a virtualization layer for the enterprise class memory (626) so that only an appropriate amount (rather than all) of the memory resources of the enterprise class memory (626) is allocated to and utilized by the compute resource set A (612). At step 13, the system control processor (624) prepares the enterprise class memory (626) for use as a bare metal resource by setting up an appropriate layer of indirection and, at step 14, allocates a portion of the virtualized enterprise class memory (626) to the composed information handling system.

At step 15, the system control processor (624) generates and sends a notification to the system control processor (614) of the information handling system A (610) to indicate that the portion of the memory resources of the enterprise class memory (626) is to be added to the composed information handling system.

At step 16, the system control processor (614) prepares to begin pass through operation with respect to the enterprise class memory (626) by setting up an appropriate connection with the system control processor (624) of information handling system B (620).

At step 17, the system control processor (614) presents the virtualized portion of the enterprise class memory (626) as a bare metal resource to the compute resource set A (612).

In step 18, the compute resource set A (612) discovers the enterprise class memory (626) as the bare metal resource and begins to utilize it by sending read/write commands to the system control processor (614) which relays the commands to the system control processor (624). The system control processor (624) thereby translates the commands based on the virtualization layer employed by the system control processor (624) and sends the translated commands (e.g., logical block address to physical block address translation) to the enterprise class memory (626).

At this point in time, the composed information handling system is providing database services by managing a cache stored in the enterprise class memory (626) thereby allowing the database services to continue to be provided without degradation even though the amount of memory resources required to support the cache to an amount that would have exceeded those available to the composed information handling system had the enterprise class memory (626) not been allocated to it at the second point in time.

End of Example

Thus, as illustrated in FIGS. 6.1-6.2, embodiments of the invention may provide a system that enables computing resources to be efficiently used to provide desired computer implemented services by tailoring the quantity of computer implemented services allocated for providing the computer implemented services to match the computing resource requirements for providing the computer implemented services over time.

Figure 7:
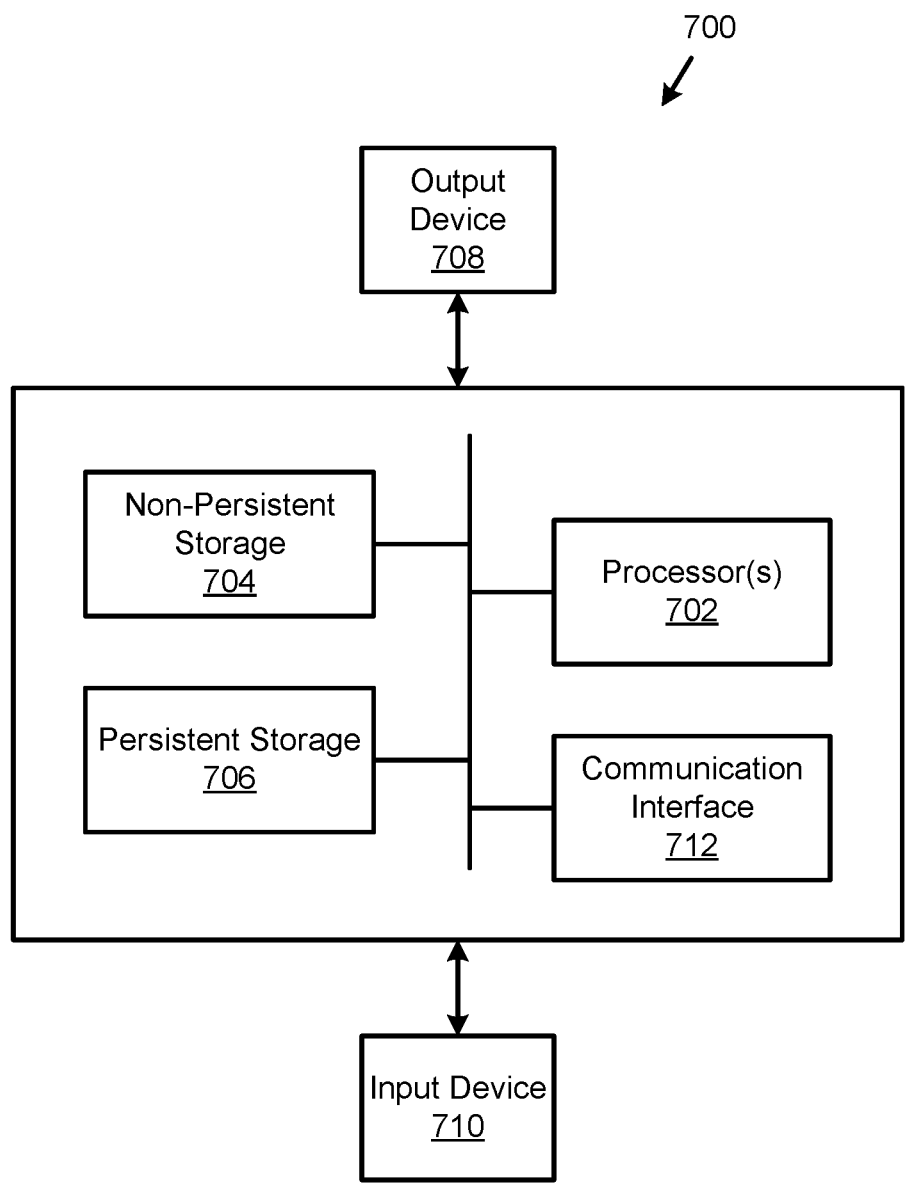
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth® interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for dynamically instantiated composed information handling systems. Specifically, embodiments of the invention may provide a system that limits the ability of various computing resources to be reserved for future allocation purposes. For example, the allocations may be limited based on the priority level of workloads to be performed using the computing resources when the quantity of free computing resources falls below a predetermined quantity. After a workload completes (or the computing resources required to perform the workload changes), the computing resources may be automatically deallocated thereby freeing them for reservation and allocation for the performance of other workloads. Consequently, the system may reduce the likelihood of computing resources being over-provisioned while also improving the likelihood that sufficient computing resources are available for performing the workloads as the computing resource requirements for performance of the workloads changes over time.

Thus, embodiments of the invention may address the problem of limited computing resources in a distributed system for performing workloads. For example, by reserving computing resources for performance of workloads in the future, the quality of the computer implemented services provided by performance of the workloads may be maintained while the computing resource cost for performing the workloads changes over time.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A system control processor manager for servicing workloads using composed information handling systems instantiated using information handling systems, comprising:
   persistent storage; and
   a workload manager programmed to:
      obtain a workload request for a workload of the workloads;
      predict future resource needs for the workload during a future time period;
      make a determination that a portion of free resources of the information handling systems are available to meet the future resource needs;
      reserve the portion of the free resources based on the determination to obtain reserved resources during the future time period;
      compose a composed information handling system of the composed information handling systems using the reserved resources during the future time period to service the workload request;
      obtain a second workload request for a second workload of the workloads;
      predict second future resource needs for the second workload during a second future time period;
      activating a reservation system in response to determining that the future resource needs exceeds a threshold value, wherein the reservation system limits an ability of resources to be reserved;
      make a second determination, using the reservation system, that an insufficient quantity of the free resources of the information handling systems are available to meet the future resource needs;
      in response to the second determination:
         make a third determination, using the reservation system, that second reserved resources can be freed to meet the future resource needs;
         free the second reserved resources based on the third determination and reserve the freed second reserved resources to obtain third reserved resources; and
         compose a second composed information handling system of the composed information handling systems using the third reserved resources during the second future time period to service the second workload request.

2. The system control processor manager of claim 1, wherein the composed information handling system comprises a compute resource set, a hardware resource set, and a control resource set comprising a system control processor.

3. The system control processor manager of claim 2, wherein the control resource set presents abstracted computing resources of the hardware resource set as bare metal resources to the compute resource set.

4. The system control processor manager of claim 1, wherein freeing the second reserved resources comprises:
   deallocating the second reserved resources from a third composed information handling system of the composed information handling systems.

5. The system control processor manager of claim 4, wherein the third determination is based on a comparison of a first priority of the second workload to a second priority of a third workload of the workloads that will be performed by the third composed information handling system during the second future time period.

6. The system control processor manager of claim 4, wherein the third determination is based on a comparison of a first workload type of the second workload to a second workload type of a third workload of the workloads that will be performed by the third composed information handling system during the second future time period.

7. The system control processor manager of claim 1, wherein freeing the second reserved resources comprises:
   delisting a reservation of the second reserved resources from a resource reservation management repository while the second reserved resources are not allocated to a third composed information handling system of the composed information handling systems.

8. A method for servicing workloads using composed information handling systems instantiated using information handling systems, comprising:
   obtaining a workload request for a workload of the workloads;
   predicting future resource needs for the workload during a future time period;
   making a determination that a portion of free resources of the information handling systems are available to meet the future resource needs;
   reserving the portion of the free resources based on the determination to obtain reserved resources during the future time period;
   composing a composed information handling system of the composed information handling systems using the reserved resources during the future time period to service the workload request;
   obtaining a second workload request for a second workload of the workloads;
   predicting second future resource needs for the second workload during a second future time period;
   activating a reservation system in response to determining that the future resource needs exceeds a threshold value, wherein the reservation system limits an ability of resources to be reserved;
   making a second determination, using the reservation system, that an insufficient quantity of the free resources of the information handling systems are available to meet the future resource needs;
   in response to the second determination:
      making a third determination, using the reservation system, that second reserved resources can be freed to meet the future resource needs;

freeing the second reserved resources based on the third determination and reserve the freed second reserved resources to obtain third reserved resources; and composing a second composed information handling system of the composed information handling systems using the third reserved resources during the second future time period to service the second workload request.

9. The method of claim 8, wherein the composed information handling system comprises a compute resource set, a hardware resource set, and a control resource set comprising a system control processor.

10. The method of claim 9, wherein the control resource set presents abstracted computing resources of the hardware resource set as bare metal resources to the compute resource set.

11. The method of claim 8, wherein freeing the second reserved resources comprises:

deallocating the second reserved resources from a third composed information handling system of the composed information handling systems.

12. The method of claim 11, wherein the third determination is based on a comparison of a first priority of the second workload to a second priority of a third workload of the workloads that will be performed by the third composed information handling system during the second future time period.

13. The method of claim 11, wherein the third determination is based on a comparison of a first workload type of the second workload to a second workload type of a third workload of the workloads that will be performed by the third composed information handling system during the second future time period.

14. The method of claim 8, wherein freeing the second reserved resources comprises:

delisting a reservation of the second reserved resources from a resource reservation management repository while the second reserved resources are not allocated to a third composed information handling system of the composed information handling systems.

15. A non-transitory computer readable medium comprising computer readable program code, which when executed by a computer processor enables the computer processor to perform a method for servicing workloads using composed information handling systems instantiated using information handling systems, the method comprising:

obtaining a workload request for a workload of the workloads;

predicting future resource needs for the workload during a future time period;

making a determination that a portion of free resources of the information handling systems are available to meet the future resource needs;

reserving the portion of the free resources based on the determination to obtain reserved resources during the future time period;

composing a composed information handling system of the composed information handling systems using the reserved resources during the future time period to service the workload request;

obtaining a second workload request for a second workload of the workloads;

predicting second future resource needs for the second workload during a second future time period;

activating a reservation system in response to determining that the future resource needs exceeds a threshold value, wherein the reservation system limits an ability of resources to be reserved;

making a second determination, using the reservation system, that an insufficient quantity of the free resources of the information handling systems are available to meet the future resource needs;

in response to the second determination:

making a third determination, using the reservation system, that second reserved resources can be freed to meet the future resource needs;

freeing the second reserved resources based on the third determination and reserve the freed second reserved resources to obtain third reserved resources; and composing a second composed information handling system of the composed information handling systems using the third reserved resources during the second future time period to service the second workload request.

16. The non-transitory computer readable medium of claim 15, wherein the composed information handling system comprises a compute resource set, a hardware resource set, and a control resource set comprising a system control processor.

17. The non-transitory computer readable medium of claim 16, wherein the control resource set presents abstracted computing resources of the hardware resource set as bare metal resources to the compute resource set.

* * * * *